US011623895B2

(12) United States Patent
Sroka et al.

(10) Patent No.: US 11,623,895 B2
(45) Date of Patent: Apr. 11, 2023

(54) WATER-REPELLENT CONCRETE ADMIXTURE

(71) Applicant: The Euclid Chemical Company, Cleveland, OH (US)

(72) Inventors: Ken Sroka, Parma, OH (US); Jeremiah Brown, Orwell, OH (US)

(73) Assignee: THE EUCLID CHEMICAL COMPANY, Cleveland, OH (US)

( * ) Notice: Subject to any disclaimer, the term of this patent is extended or adjusted under 35 U.S.C. 154(b) by 0 days.

(21) Appl. No.: 14/601,563

(22) Filed: Jan. 21, 2015

(65) Prior Publication Data

US 2015/0203408 A1 Jul. 23, 2015

Related U.S. Application Data

(63) Continuation of application No. 61/930,023, filed on Jan. 22, 2014.

(51) Int. Cl.
| | | |
|---|---|---|
| *C04B 28/04* | (2006.01) | |
| *C04B 40/00* | (2006.01) | |
| *C04B 28/02* | (2006.01) | |
| *C04B 103/65* | (2006.01) | |
| *C04B 111/27* | (2006.01) | |

(52) U.S. Cl.
CPC .......... *C04B 40/0039* (2013.01); *C04B 28/02* (2013.01); *C04B 2103/65* (2013.01); *C04B 2111/27* (2013.01)

(58) Field of Classification Search
CPC . C04B 20/10; C04B 20/1025; C04B 20/1055; C04B 24/42; C04B 24/08; C04B 24/121; C04B 2103/65; C04B 28/02; C04B 40/0039; C04B 2111/27
See application file for complete search history.

(56) References Cited

U.S. PATENT DOCUMENTS

| | | | | |
|---|---|---|---|---|
| 5,306,344 A | * | 4/1994 | Gutmann | ................ C04B 24/12 106/714 |
| 6,398,865 B1 | * | 6/2002 | Morita | .................... C04B 24/42 106/634 |
| 6,403,163 B1 | | 6/2002 | Fisher et al. | |
| 6,610,782 B1 | * | 8/2003 | Weiland | .............. C04B 41/4922 524/837 |
| 8,747,550 B1 | * | 6/2014 | Walloch | .................. C04B 28/02 106/691 |
| 2002/0100394 A1 | * | 8/2002 | Lu | ........................... C04B 24/08 106/696 |
| 2011/0041736 A1 | * | 2/2011 | Gartner | ................. C04B 28/065 106/693 |
| 2012/0227630 A1 | * | 9/2012 | Gray | ....................... C04B 38/08 106/672 |

OTHER PUBLICATIONS

"High Strength Concrete". Portland Cement Association. May 11, 2011. Retrieved from https://web.archive.org/web/20110511084119/http://www.cement.org/basics/concreteproducts_histrength.asp.*
"Concrete Strength". Understanding Cement. Jan. 16, 2010. Retrieved from https://web.archive.org/web/20100116025739/http://www.understanding-cement.com/strength.html.*
"Investigation of the effects of fatty acids on the compressive strength of the concrete and the grindability of the cement" to Albayrak et al. Cement and concrete research; vol. 35, issue 2, Feb. 2005,pp. 400-401 (Year: 2005).*

* cited by examiner

*Primary Examiner* — Shuangyi Abu Ali
(74) *Attorney, Agent, or Firm* — Calfee, Halter & Griswold LLP

(57) ABSTRACT

Various inventive concepts of the present invention are directed to a water-repellent concrete admixture for the production of water-repellent masonry. In some exemplary embodiments, the water-repellent admixture includes water, a hydrolyzable silane, at least one silicone; and an amino-functional silane. The water-repellent concrete admixture is incorporated integrally into a concrete mixture.

12 Claims, No Drawings

WATER-REPELLENT CONCRETE ADMIXTURE

RELATED APPLICATIONS

The present application claims priority to U.S. provisional application No. 61/930,023, filed on Jan. 22, 2014, which is hereby incorporated by reference in its entirety.

BACKGROUND

Imparting or improving the water repellency and resulting efflorescence control of concrete masonry and other manufactured concrete products has been a long-standing goal in concrete production. Traditionally, water-repellency is obtained by applying a water resistant coating or penetrating sealer to the surface of concrete to preserve the appearance of and extend the concrete's service life by resisting ingress of water or other contaminants. These products may be spray or roller-applied to cured (hardened) concrete. Such "post-treatments" generally penetrate up to ⅛" below the surface and are chemically bonded to the substrate.

U.S. Pat. No. 6,403,163 discloses a composition for rendering inorganic building materials surfaces, such as cement masonry, water-repellent, that includes polymethyl hydrogen siloxanes, alkoxysilanes, and silicone resins. The water repellent composition is applied by topical treatment or topical coating of the surface, preferably when the surface material is still wet.

Additionally, U.S. Pat. No. 6,610,782 is directed to an aqueous silane composition for increasing the resistance to penetration by an aqueous media of an absorbent substrate. The composition includes a hydrolyzable silane, a low molecular weight silicone, an amino-functional silicone, and an amino-functional silane, with the balance being water. '782 describes that the composition is applied to the surface of the substrate and allowed to cure.

However, conventional water-repellent coatings suffer from various problems that impede the overall effectiveness of the water repellency. For instance, the coating or penetrating sealer may be exposed to harsh elements, such as wind, rain, heat, abrasion, etc., which may eventually wear down the coating. If the coating begins to crack or wear away in certain areas, water may begin to seep into the interior of the concrete unit, which is not water resistant. Water can damage the concrete, requiring premature replacement of the entire concrete unit. To avoid this, concrete units with water resistant coatings require frequent maintenance and monitoring to ensure that such coatings remain in acceptable condition.

SUMMARY

Various inventive concepts of the present invention are directed to a water-repellent concrete admixture for the production of water-repellent masonry, such as brick, concrete block, or other building block, used to build a masonry wall. In some exemplary embodiments, the water-repellent admixture includes water, a hydrolyzable silane, at least one silicone; and an amino-functional silane. The water-repellent concrete admixture is incorporated integrally into a concrete mixture.

In accordance with some exemplary embodiments, the silicone is a low-molecular weight silicone. The water-repellent admixture may further include an amino-functional silicone.

The water-repellent concrete admixture may be present in the concrete mixture in an amount from about from about 0.5 ounces to about 10 ounces per 100 lbs of cement.

In addition, inventive concepts further provide a concrete mixture including concrete and a water-repellent admixture. The water-repellent admixture includes water, a hydrolyzable silane, at least one silicone, and an amino-functional silane. In some exemplary embodiments, the concrete mixture further includes an amino-functional silicone. The water-repellent concrete admixture may be present in the concrete mixture in an amount from about 0.5 ounces to about 10 ounces per 100 lbs of cement.

In some exemplary embodiments, the concrete mixture further includes at least one co-admixture. The co-admixture may include one or more of a fatty acid-based admixture, an accelerator, retarder, plasticizer, pigment, corrosion inhibitor, bonding agent, and the like. The co-admixture(s) may be included in an amount from about 0.5 to about 10.0 ounces per 100 lbs of cement.

In addition, inventive concepts further provide a concrete masonry product. The concrete masonry product is formed from a concrete mixture that includes concrete and a water-repellent concrete admixture. The water-repellent admixture includes water, a hydrolyzable silane, at least one silicone, and an amino-functional silane. In some exemplary embodiments, the concrete mixture further includes an amino-functional silicone. The water-repellent concrete admixture may be present in the concrete mixture in an amount from about from about 0.5 ounces to about 10 ounces per 100 lbs of cement.

In some exemplary embodiments, the concrete masonry unit produced from the concrete mixture has a compressive strength of at least 2,000 psi (load bearing concrete masonry units), or of at least 3,000 psi (dry-cast segmental retaining wall units), or 8,000 psi (solid concrete interlocking paving units). In some exemplary embodiments, the concrete masonry product has a maximum water absorption of 13.0 to 18.0 lbs/ft$^3$, and in others a maximum water absorption of 5% by weight.

DETAILED DESCRIPTION

The general inventive concepts are directed to an admixture for the production of water-resistant and efflorescence controlled concrete masonry products. The term "masonry" may include any absorbent inorganic substrate, particularly building compositions, including but not limited to concrete block, concrete brick, segmental retaining wall units, interlocking concrete paving stones and other patio products, concrete roof tile, concrete pipe, and extruded hollow-core plank.

The masonry materials may also include manufactured stone veneer, concrete floor and roof tile, artificial stone, adobe, concrete and reinforced concrete such as found in roadways, bridge decks, airport runways, parking garage decks, and other concrete building structures.

In the context of the present application, "masonry products" refers to individual building blocks or "units" that may be bound together by mortar for the formation of various structures, such as bricks and blocks. Masonry is commonly used in constructing walls of buildings, retaining walls, and interlocking unit pavements. Although the masonry products discussed herein will be referred to as concrete units, such should be understood to mean any concrete masonry product, such as concrete block, concrete pavers, retaining walls, and the like.

Concrete units are generally produced from cast concrete, which includes Portland cement, course and/or fine aggregates (i.e., sand and gravel), and water. Optional ingredients may include supplementary cementitious materials such as fly ash, granulated blast-furnace slag, silica fume, or other waste stream by-products. For decorative applications, integral colors and/or pigments may also be included.

Additionally, various admixtures may be incorporated into concrete mixtures to impart certain characteristics not otherwise obtainable with plain concrete mixes. Chemical admixtures may be dispensed directly into concrete during the batching and mixing processes, altering the fresh and/or hardened properties in a wide variety of ways. Though admixtures are considered optional to the production of concrete, they are used regularly, and are sometimes required for a given application. Such admixtures may include accelerators to speed up hydration (hardening of the concrete), retarding (slowing of hydration), plasticizers, pigments, corrosion inhibitors, bonding agents, air entrainers and the like.

Due to the porous nature of concrete and other masonry materials, such manufactured products are very absorbent of water and other liquids. Moisture movement in concrete may contribute to problems, such as, expansion, cracking, staining, mildew, corrosion, and damage to structures caused by settling. Therefore, water repellency is an important factor in concrete and masonry construction.

As described above, conventional methods of imparting water resistance to concrete units include surface treatment of the concrete units with a coating used to seal the surface of the concrete. Such a coating is intended to enhance/preserve appearance of the concrete and extend service life by resisting ingress of water or other contaminants. As such coatings are spray or roller-applied to cured concrete surfaces, Sealers may penetrate up to ⅛ inch below the surface of the concrete and some types are chemically bonded to the substrate. Such surface coatings require additional processing steps and maintenance that increase both processing time and production expense.

The present exemplary embodiments are directed to an admixture for concrete units that render them water-repellent, without the need for topical coatings to be applied afterwards. It has been discovered that imparting water repellency to concrete units via an admixture provides improved production efficiency and performance properties over concrete that has been treated with a water-resistant coating or penetrating sealer. Particularly, incorporating a water repellent admixture into concrete mixtures for the production of concrete units, such as concrete block, has been found to improve production rate, uniformity, density, compressive strength, freeze-thaw durability, water penetration resistance, and other such properties.

In some exemplary embodiments, the admixture includes an aqueous silane composition, such that described in U.S. Pat. No. 6,610,782, fully incorporated by reference herein. In some exemplary embodiments, the aqueous silane composition includes a hydrolyzable silane, a low-molecular weight silicone, an amino-functional silicone, a amino-functional silane, and the balance water.

As described in '782, the hydrolyzable silane has a molecular weight up to about 600 (or essentially a multiple thereof, if oligomerized) and the general formula of $R_n$—Si—$(R^1)_{4-n}$, wherein R is a $C_1$-$C_{30}$ hydrocarbyl or halogenated hydrocarbyl group, $R^1$ is a $C_1$-$C_6$ alkoxy, halide, amino, carboxyl, or a mixture of any of the foregoing, and n is 1 or 2. The hydrocarbyl group comprises hydrogen and carbon atoms and may be aliphatic, or cycloaliphatic, or aryl, or aralkyl. These hydrocarbyl radicals may also contain as substituent groups, halogen, e.g., chlorine, bromine, fluorine; nitrogen; oxygen or sulfur heteroatoms. One or more of such halogen substituents may be present in the R group. The $R^1$ group can comprise $C_1$-$C_6$ alkoxy, halogen, amino, or carboxylate group. Thus, the alkyl groups that are useful as $R^1$ include methyl, ethyl, n-propyl, isobutyl and isopropyl. As indicated, n may be 1 or 2 and thus, monohydrocarbyl substituted alkoxysilanes and dihydrocarbyl substituted alkoxysilanes are contemplated by the present invention. The active ingredients of the invention can also comprise condensation dimers and trimers, or other oligomers of the silanes, as are well known in the art.

The hydrolyzable silanes can range widely in amount. However, typically the amount can comprise between about 10 and 90 percent by weight of active components of the composition, and preferably between about 20 and 80 percent by weight and especially between about 35 and 60 percent.

Specific examples of silanes useful in accordance with the present invention include, but are not limited to, methyltrimethoxysilane, methyltriethoxysilane, methyltri-n-propoxysilane, ethyltrimethoxysilane, ethyltriethoxysilane, dimethyldimethoxysilane, dimethyldiethoxysilane, ethyltri-n-propoxysilane, propyltriethoxysilane, propyltri-n-propoxysilane, butyltrimethoxysilane, butyltriethoxysilane, dibutyldimethoxysilane, isobutyltrimethoxysilane, di-isobutyldimethoxysilane, isobutyltriethoxysilane, n-hexyltrimethoxysilane, 6-chloro-hexyltrimethoxysilane, 6,6,6-trifluro hexyltrimethoxysilane, cyclohexyltrimethoxysilane, benzyltrimethoxysilane, 4-chlorobenzyltriethoxysilane, 4-bromobenzyltri-npropoxysilane, phenyltrimethoxysilane, phenyltriethoxysilane, octyltrimethoxysilane, octyltriethoxysilane, octyltriisopropoxysilane, 2-ethylhexyltrimethoxysilane, 4-chlorobenzyltrimethoxysilane, decyltrimethoxysilane, dodecyltrimethoxysilane, dodecyltribromosilane, tetradecyltriethoxysilane, hexadecyltriethoxysilane, octadecyltriethoxysilane, eicosyltrimethoxysilane, and the like, mixtures of any of them and the like, alone, and in admixture with dimers, trimers and other oligomers thereof. These silane materials may be commercially available from, for example, Degussa-Hül AG that deals with Sivento® Silanes; Gelest, Inc; Lancaster Synthesis following its acquisition of, among other things, the silanes PCR Inc. of Florida, USA, Advanced Polymer, Inc. and Dow Corning.

The low molecular weight silicone may comprise silicones having a low degree of polymerization, such as linear poly(dimethylsiloxane), The low molecular weight silicone may comprise between 10 and 90 percent by weight of active components of the water-repellent concrete admixture composition. In other exemplary embodiments, the low molecular weight silicone comprises between about 20 and 80 percent by weight of active components of the water repellent concrete admixture composition. In yet other exemplary embodiments, the low molecular weight silicone is between about 40 and 65 percent by weight of active components of the water repellent concrete admixture composition.

The low molecular weight silicone may be represented by the formula:

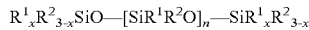

where $R^1$ is any one of H, —$(CH_2)_w(CH_3)$ w=0, 1, 2, or 3, —$CH(CH_3)_2$, —$(CH_2)_xCH(CH_3)_2$ x=0, 1, 2, or 3; $R^2$ is any one of —$O(CH_2)_yCH_3$ y=0, 1, 2, or 3 and —$O(CH_2)_zCH(CH_3)_2$ z=0, 1, 2, or 3; and n is an effective value. Although not fully knowing the range of effective values for n, the range of effective values for n may be low, such as, n=0, 1, 2, 3, or 4.

The amine value of the amino-functional silicone or siloxane may be in the composition in an amount between about 50 and 100 KOH mg/gm, preferably about 70 KOH mg/gm. The amino-functional siloxane may be about 0.5 percent by weight of the water-repellent concrete admixture composition.

An amino-functional silane that has been reacted with a non-ionic emulsifier may used in amounts of about 0.5 weight percent of the composition. The non-ionic emulsifier used in the reaction preferably includes one having reactive hydroxyl groups. For example the non-ionic emulsifier may be an ethoxylated alkyl phenol.

Alternatively, a non-ionic emulsifier may be directly added to the composition. In this case, the non-ionic emulsifier may be directly added to the composition and may be between about 2 and 3 percent by weight of the composition. A wide variety of emulsifiers mat be useful in the present invention. Nonionic, anionic, cationic and amphoteric emulsifiers are well known from the state of the art. The preferred emulsifiers are, however, nonionic. The concentration of emulsifier or emulsifiers used in accordance with the present invention may range widely, but preferably is about 3.5 wt. % of the total weight of the composition.

The aqueous silane composition of '782 is used for coating the surfaces of absorbent products, such as concrete products, to help impart water-repellency. (See, col. 1, line 14 to col. 2, line 42). Specifically, '782 describes a method for increasing the resistance to penetration by aqueous media by applying to the surface of a substrate an aqueous silane composition and allowing the composition to cure.

However, it has been discovered that incorporating a silane/silicone emulsion ("SSE") as an admixture to concrete masonry and other manufactured concrete mixtures provides many improvements over a surface application. Specifically, it has been found that incorporating an SSE admixture into freshly mixed concrete to produce various concrete units provides improvements, such as increased production rate, improved uniformity, improved efflorescence control, improved color retention, reduced surface staining, increased freeze-thaw durability, and improved water penetration resistance. Such improvements provide an improved product, while lowering manufacturing cost due to improved production and maintenance efficiency.

In some exemplary embodiments, the SSE admixture is included in cement mortar in amounts from about 0.5 ounces to about 10 ounces per 100 lbs of cement. In other exemplary embodiments, the SSE admixture is included in an amount from about 0.5 ounces to 4 ounces per 100 lbs of cement.

In some exemplary embodiments, the SSE admixture is compatible for use with one or more additional concrete admixtures or co-admixtures. The additional admixtures may include, for example, efflorescence control admixtures, plasticizing admixtures, retarders, accelerators, surface texture modifiers, air entrainers, and the like. Some exemplary admixtures include polymer-modified admixtures that include one or more of acrylic, styrene butadiene, polyvinyl acetate, and ethylene vinyl acetate.

In some exemplary embodiments, the SSE admixture is used in conjunction with a co-admixture comprising fatty acids. For example, the SSE admixture may be used in conjunction with Eucon BK-E™ from the Euclid Chemical Company. Eucon BK-E™ is a liquid tall oil fatty acid admixture used to control primary efflorescence in concrete masonry products, such as block, pavers, concrete brick, roofing tiles, and segmental retaining wall systems. Efflorescence occurs on the surface of masonry as a white, powdery substance when water entering the block through its pores comes in contact with calcium hydroxide (formed as a result of the reaction between cement or lime and water). When dry, the water soluble salts migrate to the surface, combine with the carbon dioxide in the air and form calcium carbonate. The fatty acid admixture will inhibit the formation of primary efflorescence efflorescence by filling the capillaries that allow the soluble salts to migrate to the surface. Eucon BK-E™ is a 100% actives material that effectively addresses primary efflorescence and provides density, compressive strength, and absorption improvements.

In other exemplary embodiments, the SSE mixture is used in conjunction with an admixture that includes water, polyethylene glycol, coconut diethanolamide, triethanolamine, benzenesulfonic acid, glutaraldehyde, and diethanolamine. One such exemplary admixture includes Eucon BK-S8™, which is a plasticizing admixture based on dodecylbenzenesulfonate, used to modify the surface texture of a concrete product.

In other exemplary embodiments, the SSE mixture is used in conjunction with an efflorescence control admixture that includes water, calcium stearate, triethanolamine, and glutaraldehyde. Such an admixture may include Eucon Block-tite™ from Euclid Chemical, which is primarily an efflorescence control admixture based on calcium stearate.

The co-admixture may be present in an amount from 0 to about 30 ounces per 100 lbs of cement. In some exemplary embodiments, the co-admixture is present in an amount from 0.5 to about 20 ounces per 100 lbs of cement, or from about 1.0 to about 5.0 ounces per 100 lbs of cement.

It has been discovered that including the SSE admixture alone, or in combination with a co-admixture, will provide many improvements over conventional water-repellant coatings. For example, producing concrete units by incorporating an SSE admixture has shown to provide increase production rates, reduced machine wear, low absorption by the concrete units, improved efflorescence control, maximize water tolerance, improved freeze-thaw durability, and high compressive strengths.

Additionally, by improving the processability of the concrete, inclusion of the admixture may increase the life of the molds used to form the concrete units. Particularly, in some exemplary embodiments, the SSE admixture helps lubricate the molds, thus cutting down on the abrasion experienced when the concrete units are removed from the molds.

Having generally introduced the general inventive concepts by disclosing various exemplary embodiments thereof, a further understanding can be obtained by reference to certain specific examples illustrated below which are provided for purposes of illustration only and are not intended to be all inclusive or otherwise limiting of the general inventive concepts.

EXAMPLES

In order to more thoroughly describe this invention, the following working examples are provided.

Example 1

Water Repellent Admixture

Concrete blocks were formed from cement mixtures including 1010 lbs of Type III cement, and 8750 lbs of Stalite™ expanded slate aggregate material to produce a cement/aggregate ratio of 1:8.7. The water-repellent admixture ("SSE admixture") was then introduced into the cement mixture in varying amounts. Comparative Example #1 is included as the control and did not include any admixture, Sample #1 included 0.5 ounces/100 lbs of cement ("oz/cwt") of the SSE admixture, Sample #2 included 2 oz/cwt of the SSE admixture, and Sample #3 included 2.5 oz/cwt. of the SSE admixture. The cement mixtures were then used to form standard 8" lightweight concrete blocks. Details of the compositions are provided below in Table 1.

As shown above in Table 1, incorporation of the water repellent concrete admixture into the concrete mixture improves processing parameters, including feed time, cycle time, cycles per minute, and blocks produced per hour. The improvement in cycle time and increased cycles per minute was an unexpected benefit of using the SSE admixture.

Sample #1, a concrete mixture including 0.5 oz/cwt SSE admixture, produced 3.4% more concrete blocks per hour than the Comparative Example #1 (control, containing no admixture). Additionally, Sample #2, including 2.0 oz./cwt. SSE admixture produced 6.8% more concrete blocks per hour and Sample #3, including 2.5 oz./cwt SSE admixture produced 8.5% more concrete blocks per hour than Comparative Example #1. Accordingly, inclusion of even 0.5 oz/cwt of the SSE admixture improved production time by increasing the block/hour output. This leads to significant cost savings over a year.

Incorporation of the water repellent admixture further improved the performance properties of the concrete blocks produced from concrete mixture. For instance, Sample #1 demonstrated a 12.9% increase in compressive strength over Comparative Example #1, Sample #2 demonstrated a 15.9% increase in compressive strength over Comparative Example #1, and Sample #3 demonstrated a 4.3% increase in compressive strength over Comparative Example #1. With regard to absorption, inclusion of the water repellent admixture reduced absorption of Sample #1 by 7.1%, Sample #2 by 7.1%, and Sample #3 by 15%, as compared to Comparative Example #1.

TABLE 1

| | Cement Blocks formed with SSE admixture | | | |
|---|---|---|---|---|
| | Comparative Ex. 1 | Sample #1 | Sample #2 | Sample #3 |
| Total cement (lbs/kg) | 1010 lbs | 1010 lbs | 1010 lbs | 1010 lbs |
| Total aggregate | 8750 lbs | 8750 lbs | 8750 lbs | 8750 lbs |
| Cement:aggregate ratio | 1:8.7 | 1:8.7 | 1:8.7 | 1:8.7 |
| SSE Admixture | 0 | 0.5 oz/cwt | 2.0 oz/cwt | 2.5 oz/cwt |
| Feed time | 2.45 sec | 2.1 sec | 1.9 sec | 1.8 sec |
| Finish Time | 1.00 sec | 1.00 sec | 1.00 sec | 0.9 sec |
| Cycle time (avg. of 6) | 10.2 | 9.8 | 9.6 | 9.4 |
| Cycles per minute | 5.9 | 6.1 | 6.3 | 6.4 |
| Cement blocks/hour | 1770 | 1830 (+3.4%) | 1890 (+6.8%) | 1920 (+8.5%) |
| Texture (1 to 3) | 2.5 | 3 | 3 | 3 |
| Compressive strength | 2320 psi | 2620 psi (+12.9%) | 2690 psi (+15.9) | 2420 psi (+4.3) |
| Absorption (lbs/ft$^3$) | 12.7 | 11.8 (−7.1%) | 11.8 (−7.1%) | 10.8 (−15.0%) |

Example 2

Water-Repellent Admixture Plus Co-Admixture

Concrete blocks were formed from cement mixtures including 328 lbs of Type III cement and 4.0 ounces of a fatty acid admixture. An SSE admixture was then introduced into, and integrally mixed with, the cement mixtures in varying amounts. Comparative Example #2, included as a control, was free of any SSE admixture. Sample #4 included 5 oz. of the SSE admixture and Sample #5 included 20 oz. of the SSE admixture. The cement mixtures were then used to form standard 8" lightweight concrete blocks. Details of the compositions are provided below in Table 2.

TABLE 2

Concrete Blocks formed with a Fatty Acid Admixture and SSE admixture

|  | Comparative Ex. 2 | Sample #4 | Sample #5 |
| --- | --- | --- | --- |
| Total cement (lbs/kg) | 328 lbs | 328 lbs | 328 lbs |
| Total aggregate | — | — | — |
| Cement:aggregate ratio | — | — | — |
| Plasticizing admixture (dodecylbenzenesulphonate) | 8 ounces or 2.4 oz/cwt | 8 ounces or 2.4 oz/cwt | 8 ounces or 2.4 oz/cwt |
| SSE Admixture | 0 | 1.5 ounces or 0.5 oz/cwt | 3.0 ounces or 1.0 oz/cwt |
| Feed time | 2.7 sec | 1.7 sec | 1.6 sec |
| Finish Time | N/A | N/A | N/A |
| Cycle time (avg. of 6) | 12.9 | 11.1 | 10.7 |
| Cycles per minute | 4.65 | 5.41 | 5.61 |
| Cement blocks/hour | 837 | 974 (+16.3%) | 1010 (+20.6%) |
| Texture (1 to 3) | 2 | 2 | 2.5 |
| Compressive strength | 4390 psi | 4900 psi | 4890 psi |
| Absorption (lbs/ft3) | 7.2 lbs/ft3 | 6.8 lbs/ft3 | 5.6 lbs/ft3 |

As illustrated above, inclusion of a plasticizing co-admixture, used in conjunction with the SSE water-repellent admixture further improves both the processing and physical properties of the resulting concrete mixtures and concrete produced therefrom. Again, the decrease in cycle time and increase in cycles per minute was an unexpected benefit of the incorporation of the SSE admixture. Additionally, the incorporation of at least 0.5 oz/cwt SSE admixture, along with 2.4 oz/c plasticizing admixture improves the compressive strength of the resulting concrete blocks produced to 4900 psi, compared to 4390 psi of concrete blocks produced using the fatty acid admixture alone, and to 2320 concrete blocks produced without using any admixture. Additionally, the concrete blocks produced using both SSE water-repellent admixture and a plasticizing co-admixture demonstrate reduced absorption of 6.8 and 5.6 lbs/ft$^3$, compared to 7.2 lbs/ft$^3$ from a concrete block produced using the plasticizing admixture alone, and to 12.7 lbs/ft$^3$ from a concrete block produced without using any admixture.

Example 3

Water-Repellent Admixture Plus Additional Co-Admixtures

Six sets of concrete segmental retaining wall blocks were produced, each incorporating admixtures. The control included a mixture of cement and aggregates (together "cement mixture") and 4.0 oz/c of a fatty acid liquid co-admixture, Eucon BK-E™. The control was tested against five exemplary compositions. Samples A-D included Eucon BK-S8™ co-admixture, including water, polyethylene glycol, coconut diethanolamide, triethanolamine, benzenesulfonic acid, glutaraldehyde, and diethanolamine. Sample A also included Eucon Blocktite™ admixture, which is a traditional water-repellent liquid admixture comprising water, calcium stearate, triethanolamine, and glutaraldehyde. Samples B-E included an exemplary SSE water-repellent admixture.

The physical properties of the concrete blocks produced from each sample were measured and compared to the control. Specifically, compressive strength and absorption were measured in accordance with ASTM C-140. The results are shown below in Tables 3(a)-(b).

TABLE 3(a)

| Cement | Control 1 | Control 2 | Control 3 | A-1 | A-2 | A-3 | B-1 | B-2 | B-3 |
|---|---|---|---|---|---|---|---|---|---|
| Eucon BK-E ™ | 4.0 oz/cwt | 4.0 oz/cwt | 4.0 oz/cwt | — | — | — | — | — | — |
| Eucon Blocktite ™ | — | — | — | 20.0 oz/cwt | 20.0 oz/cwt | 20.0 oz/cwt | — | — | — |
| Eucon BK-S8 ™ | — | — | — | 4.0 oz/cwt | 4.0 oz/cwt | 4.0 oz/cwt | 4.0 oz/cwt | 4.0 oz/cwt | 4.0 oz/cwt |
| SSE admixture | — | — | — | — | — | — | 1.5 oz/cwt | 1.5 oz/cwt | 1.5 oz/cwt |
| Avg. Area in.$^2$ | 6.44 | 6.30 | 6.31 | 6.24 | 6.32 | 6.32 | 6.19 | 6.20 | 6.33 |
| Load, lbs. | 31,700 | 29,865 | 28,905 | 44,080 | 50,110 | 35,655 | 43,170 | 36,910 | 47,015 |
| Comp. Strength, psi | 4,920 | 4,740 | 4,580 | 7,060 | 7,930 | 5,640 | 6,970 | 5,950 | 7,430 |
| Avg. Comp. St. psi | | 4,750 | | | 6,880 | | | 6,780 | |
| Absorption (lbs/ft$^3$) | 6.7 | 5.8 | 4.6 | 5.7 | 4.5 | 6.1 | 5.6 | 5.5 | 5.8 |
| Absorption (%) | 5.1 | 4.3 | 4.6 | 4.2 | 3.3 | 4.5 | 4.1 | 4.0 | 4.1 |
| Density | 130.6 | 134.2 | 132.6 | 134.0 | 137.8 | 134.0 | 136.4 | 137.9 | 136.5 |

TABLE 3(b)

Sample Admixtures (cont.)

| Cement | C-1 | C-2 | C-3 | D-1 | D-2 | D-3 | E-1 | E-2 | E-3 |
|---|---|---|---|---|---|---|---|---|---|
| Eucon BK-E ™ | — | — | — | — | — | — | — | — | — |
| Eucon Blocktite ™ | — | — | — | — | — | — | — | — | — |
| Eucon BK-S8 ™ | 4.0 oz/cwt | 4.0 oz/cwt | 4.0 oz/cwt | 4.7 oz/cwt | 4.7 oz/cwt | 4.7 oz/cwt | — | — | — |
| SSE admixture | 2.0 oz/cwt | 2.0 oz/cwt | 2.0 oz/cwt | 2.3 oz/cwt | 2.3 oz/cwt | 2.3 oz/cwt | 1.0 oz/cwt | 1.0 oz/cwt | 1.0 oz/cwt |
| Avg. Area in.$^2$ | 6.46 | 6.44 | 6.40 | 6.55 | 6.40 | 6.62 | 6.29 | 6.44 | 6.59 |
| Load, lbs. | 38,345 | 37,910 | 39,265 | 37,235 | 36,375 | 39,305 | 32,210 | 33,840 | 40,265 |
| Comp. Strength, psi | 5,940 | 5,890 | 6,140 | 5,680 | 5,680 | 5,940 | 5,120 | 5,250 | 6,110 |
| Avg. Comp. St. psi | | 5,990 | | | 5,770 | | | 5,490 | |
| Absorption (lbs/ft3) | 5.3 | 5.1 | 5.3 | 5.3 | 5.3 | 5.3 | 6.6 | 6.8 | 6.2 |
| Absorption (%) | 3.9 | 3.7 | 3.9 | 3.8 | 3.9 | 3.8 | 4.9 | 5.2 | 4.6 |
| Density | 137.4 | 137.3 | 137.3 | 138.4 | 137.2 | 137.7 | 133.4 | 132.1 | 134.8 |

As illustrated in Tables 3(a) and (b), concrete mixtures that include the SSE admixture have improved properties over conventional concrete mixtures. Specifically, the concrete compositions that include the SSE admixture demonstrate improved compression strength, lower absorption, and form higher density concrete blocks.

The concrete block samples were also tested for freeze-thaw durability. Such testing measures the concrete's resistance to surface and structural damage caused by alternating freezing and thawing. The test was performed according to ASTM C1262, with one freeze-thaw cycle being defined as a completed freezing cycle followed by a completed thawing cycle. The test is performed in 20 cycle intervals and the cumulative weight loss is recorded.

TABLE 4

Freeze-Thaw Values

| Sample: | | A | B | C | D |
|---|---|---|---|---|---|
| Estimated % Weight Loss | 20 cycles | 0.17 | 0.03 | 0.14 | 0.07 |
| | 40 cycles | 0.40 | 0.03 | 0.14 | 0.05 |
| | 60 cycles | 0.24 | 0.04 | 0.05 | 0.05 |
| | 80 cycles | 0.20 | 0.03 | 0.09 | 0.06 |
| | 100 cycles | 0.19 | 0.04 | 0.09 | 0.05 |
| | 120 cycles | 0.22 | 0.06 | 0.07 | 0.05 |
| | 140 cycles | 0.59 | 0.05 | 0.04 | 0.07 |
| | 150 cycles | 2.42 | 0.01 | 0.02 | 0.03 |
| | Total | 4.60 | 0.30 | 0.67 | 0.44 |

As illustrated in Table 4 above, the use of SSE admixture significantly improves a concrete block's ability to withstand freeze-thaw cycles without experiencing weight loss greater than 1.0% after 150 cycles. This is a great improvement over conventional cement mixtures, with weight loss of almost 5.0% after 150 cycles.

Example 3

Production Improvements 3.1 Concrete Block

Standard gray blocks were produced using a block machine both conventionally (no SSE admixture) and with the SSE admixture, as outlined below.

TABLE 5

Concrete Block Samples

| | Block 1(a) | Block 1(b) | Block 2(a) | Block 2(b) | Block 3(a) | Block 3(b) |
|---|---|---|---|---|---|---|
| SSE admixture | 0 | 1 oz/cwt. | 0 | 0.5 oz/cwt | 0 | 0.5 oz/cwt. |
| Blocks/Second | 5 per 10.6 sec. | 5 per 9.7 sec. | 5 per 10.1 sec. | 5 per 9.6 sec. | 3 per 12.4 sec. | 3 per 10.7 |
| Blocks/Hour | 1,018/hour | 1,113/hour | 1,782 | 1,875 | 871 | 1,009 |
| Difference/year | — | +237,500 | — | +232,500 | — | +345,000 |

As illustrated above, in Table 5, the concrete blocks produced using at least 0.5 oz/cwt of the SSE admixture significantly increased the amount of blocks produced per second and by default, blocks per hour. Such an improvement resulted in an increase in block production per year of over 230,000 blocks, which maximizes output while using the same amount of resources and raw material. By increasing the output, there is reduced wear on the molds, which may extend the life of the molds, saving additional capital and expense.

3.1 Paving Stones

Standard paving stones were produced both conventionally (no SSE admixture) and with the SSE admixture, as outlined below.

TABLE 6

Paving Stone Samples

| | Stone 1(a) | Stone 1(b) | Stone 2(a) | Stone 2(b) | Stone 3(a) | Stone 3(b) |
|---|---|---|---|---|---|---|
| SSE admixture | 0 | 2 oz/cwt. | 0 | 1.5 oz/cwt. | 0 | 2 oz/cwt. |
| Comp. Strength | 9,350 psi | 13,670 psi (+32%) | 6,850 psi | 8,450 psi (+23%) | 9,870 psi | 11,290 psi (+14%) |
| Density | 136.4 lb/ft$^3$ | 143.2 lb/ft$^3$ (+6.81b/ft$^3$) | 124.1 lb/ft$^3$ | 131.0 lb/ft$^3$ (+6.9 lb/ft$^3$) | 128.1 lb/ft$^3$ | 135.2 lb/f$^3$ (+7.1 lb/ft$^3$) |
| Absorption | 5% | 3.8% (−24%) | 7.4% | 4.9% (−34%) | 7.7% | 3.6% (−53%) |

As illustrated above, paving stones produced using the SSE concrete admixture demonstrated an improved compressive strength by at least 14% and produced stones having a density at least 6.8 lbs/ft$^3$ higher than stones produced without the SSE admixture. Additionally, paving stones produced using the SSE admixture demonstrated a water resistance of at least 24 more than the paving stones produced without the admixture.

3.3 Segmental Retaining Wall ("SRW") Units.

Segmental retaining wall units were also produced, both including a conventional admixture and including the SSE admixture. The SRWs produced with the conventional admixture at 4 oz/cwt weighed approximately 86.7 lbs. In contrast, the SRWs produced with 2 oz/cwt SSE admixture and 4 oz/cwt Eucon BK-S8 weighed approximately 91.8 lbs, which is an increase in density of about 6%. Therefore, the SRWs produced using the SSE admixture were able to achieve a higher density at the same production rate as those produced using a traditional admixture.

Although only a few embodiments of the present invention have been described above, it should be appreciated that many modifications can be made without departing from the spirit and scope of the invention. All such modifications are intended to be included within the scope of the present invention, which is to be limited only by the following claims:

The invention claimed is:

1. A concrete masonry product consisting of: aggregate; and a cement mixture consisting of: Portland cement; and an aqueous water repellent concrete admixture integrally incorporated into the Portland cement, said aqueous water repellent concrete admixture consisting of: water; 10%-90% hydrolyzable silane based on a weight of non-aqueous components of the aqueous water repellent concrete admixture; at least one amino-functional silicone; an amino-functional silane, wherein said aqueous water repellent concrete admixture is present in an amount from 0.5 ounces to 1.0 ounces per 100 lbs of the cement mixture; and optionally, a plasticizing co-admixture comprising one or more of fatty acids, polyethylene glycol, coconut diethanolamide, benzesulfonic acid, and glutaraldehyde, present in an amount between 1.0 and 20 ounces per 100 lbs of the cement mixture, wherein said concrete masonry product has a compression strength greater than the compression strength of an otherwise identical product that excludes the aqueous water repellent concrete admixture; wherein said concrete masonry product has a compressive strength of at least 2,000 psi; and wherein said concrete masonry product has a maximum water absorption of 13.0 to 18.0 lb/ft$^3$.

2. The concrete masonry product of claim 1, wherein said at least one amino-functional silicone is a low-molecular weight silicone.

3. The concrete masonry product of claim 2, wherein said low-molecular weight silicone is present in an amount between 9.5% and 89.5% based on the weight of non-aqueous components of the aqueous water repellent concrete admixture.

4. The concrete masonry product of claim 1, wherein said amino-functional silicone has an amine value between 50 and 100 KOH mg/gm.

5. A cement mixture, consisting of Portland cement; and 0.5 to less than 1.0 ounces per 100 lbs of the cement mixture of an aqueous water-repellent concrete admixture consisting of water; 10%-90% of a hydrolyzable silane based on a weight of non-aqueous components of the aqueous water repellent concrete admixture at least one amino-functional silicone; and an amino-functional silane, wherein said water-repellent concrete admixture is integrally incorporated into said cement mixture; and a plasticizing co-admixture comprising one or more of fatty acids, polyethylene glycol, coconut diethanolamide, benzesulfonic acid, and glutaraldehyde, present in an amount between 2.4 and 20 ounces per 100 lbs of the cement mixture, wherein cement mixture, when cured, has a compression strength greater than the compression strength of an otherwise identical cured cement mixture that excludes the aqueous water repellent concrete admixture; wherein cement mixture, when cured, has a compressive strength of at least 2,000 psi; and wherein cement mixture, when cured, has a maximum water absorption of 13.0 to 18.0 lb/ft$^3$.

6. The cement mixture of claim 5, wherein said amino-functional silicone has an amine value between 50 and 100 KOH mg/gm.

7. The cement mixture of claim 5, wherein said plasticizing co-admixture is included in an amount from 4.0 to 10.0 ounces per 100 lbs of the cement mixture.

8. The cement mixture of claim 5, wherein said plasticizing co-admixture is included in an amount from 4.0 to 5.0 ounces per 100 lbs of the cement mixture.

9. The concrete masonry product of claim 1, wherein said product has a compressive strength of at least 3,000 psi.

10. The concrete masonry product of claim 1, wherein the at least one amino-functional silicone is about 0.5 percent by weight of the aqueous water-repellent concrete admixture.

11. A concrete masonry product comprising a cured product prepared from a mixture of an aggregate; and a cement mixture comprising:
Portland cement; and an aqueous water repellent concrete admixture integrally incorporated into the concrete masonry product, said aqueous water repellent concrete admixture consisting of water; a hydrolyzable silane; at least one amino-functional silicone; an amino-functional silane, wherein said aqueous water repellent concrete admixture is present in an amount from 0.5 ounces to 1.0 ounces per 100 lbs of the cement mixture; and optionally, a plasticizing co-admixture comprising one or more of fatty acids, polyethylene glycol, coconut diethanolamide, benzesulfonic acid, and glutaraldehyde, present in an amount between 1.0 and 20 ounces per 100 lbs of the cement mixture, wherein said concrete masonry product has a compression strength greater than the compression strength of an otherwise identical product that excludes the aqueous water repellent concrete admixture; wherein said concrete masonry product has a compressive strength of at least 2,000 psi; and wherein said concrete masonry product has a maximum water absorption of 13.0 to 18.0 lb/ft$^3$.

12. The concrete masonry product of claim 11, wherein the cement mixture further includes one or more of fly ash, granulated blast-furnace slag, silica fume, integral colors, pigments, or other waste stream by-products.

* * * * *